(12) United States Patent
Sommer et al.

(10) Patent No.: US 11,483,461 B2
(45) Date of Patent: Oct. 25, 2022

(54) TECHNIQUES FOR FORMING SUSPENSION ASSEMBLIES FOR A CAMERA

(71) Applicant: Apple Inc., Cupertino, CA (US)

(72) Inventors: Phillip R. Sommer, Newark, CA (US); Moran Koren, Herzliya (IL); Adar Magen, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/399,917

(22) Filed: Aug. 11, 2021

(65) Prior Publication Data

US 2022/0053111 A1 Feb. 17, 2022

Related U.S. Application Data

(60) Provisional application No. 63/064,532, filed on Aug. 12, 2020.

(51) Int. Cl.
*H04N 5/225* (2006.01)
(52) U.S. Cl.
CPC .................................. *H04N 5/2254* (2013.01)
(58) Field of Classification Search
CPC .................................................... H04N 5/2254
See application file for complete search history.

(56) References Cited

U.S. PATENT DOCUMENTS

| 9,088,705 | B1 | 7/2015 | Tam |
| 9,880,371 | B2 | 1/2018 | Gutierrez et al. |
| 9,906,114 | B2 | 2/2018 | Liao |
| 2019/0141248 | A1* | 5/2019 | Hubert ................. G02B 27/646 |
| 2022/0014677 | A1* | 1/2022 | Smyth ................ H02K 41/0354 |

FOREIGN PATENT DOCUMENTS

WO 2010108041 9/2010

OTHER PUBLICATIONS

"SMA OIS", Hutchinson Technology Inc., Retrieved from https://www.hutchinson.tdk.com/WebHTI/Contents/PageId/58 on Jul. 1, 2020, pp. 1-4.

* cited by examiner

*Primary Examiner* — Gary C Vieaux
(74) *Attorney, Agent, or Firm* — Robert C. Kowert; Kowert, Hood, Munyon, Rankin & Goetzel, P.C.

(57) ABSTRACT

A suspension assembly of a camera, with electrical traces, may be formed using one or more electroforming processes. The suspension assembly may include one or more flexure arms connecting an inner frame to an outer frame of the camera. The inner frame may be moveable relative to the outer frame to implement autofocus and/or optical image stabilization functions for the camera. The electrical traces may be formed at a first side of a substrate, using one or more electroforming processes. Next, one or more cavities in various shapes may be created in one or more dry film photoresist (DFR) layers at a second side of the substrate by exposing the DFR layers to ultraviolet light. One or more electroforming processes may be used to deposit one or more materials in to the cavities to form one or more components, e.g., a flexure arm, of the suspension assembly.

20 Claims, 12 Drawing Sheets

*Lithography*

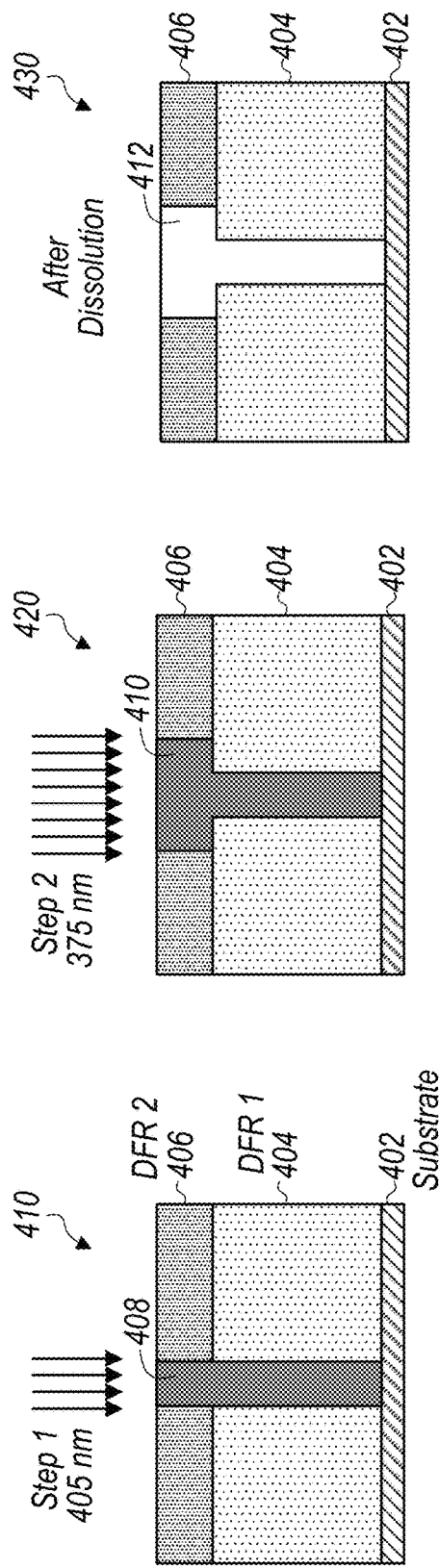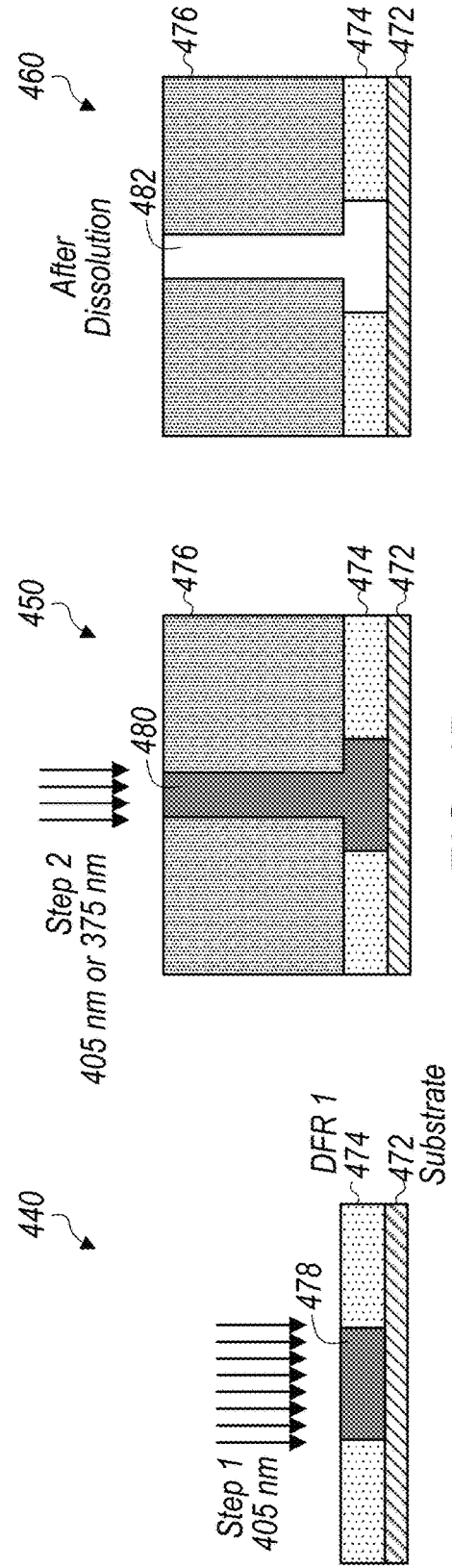

*Lithography*

*Etching*

Third DFR lamination added

Etching substrate between circuits

DFR lamination stripped away

TECHNIQUES FOR FORMING SUSPENSION ASSEMBLIES FOR A CAMERA

This application claims benefit of priority to U.S. Provisional Application Ser. No. 63/064,532, entitled "Techniques for Forming Suspension Assemblies for a Camera," filed Aug. 12, 2020, and which is incorporated herein by reference in its entirety.

BACKGROUND

Technical Field

This disclosure relates generally to suspension assemblies for a camera, in particular, techniques for forming a suspension assembly of a camera.

Description of the Related Art

The advent of mobile multipurpose devices such as smartphones, tablet or pad devices has resulted in a need for bigger lenses such as ultra- or super-wide lenses for integration in cameras of the devices. Some cameras may incorporate optical image stabilization (OIS) mechanisms that may sense and react to external excitation/disturbance by adjusting location of the optical lens on the X and/or Y axis in an attempt to compensate for unwanted motion of the lens. Furthermore, some cameras may incorporate an autofocus (AF) mechanism whereby the object focal distance can be adjusted to focus an object plane in front of the camera at an image plane to be captured by the image sensor. In some such AF mechanisms, the optical lens is moved as a single rigid body along the optical axis of the camera to refocus the camera.

In addition, high image quality is easier to achieve in small form factor cameras if lens motion along the optical axis is accompanied by minimal parasitic motion in the other degrees of freedom, for example on the X and Y axes orthogonal to the optical (Z) axis of the camera. Thus, some small form factor cameras that include autofocus mechanisms may also incorporate optical image stabilization (OIS) mechanisms that may sense and react to external excitation/disturbance by adjusting location of the optical lens on the X and/or Y axis in an attempt to compensate for unwanted motion of the lens. In such systems, knowledge of the position of the lens is useful.

BRIEF DESCRIPTION OF THE DRAWINGS

FIG. 4A shows one or more example lithography processes to create a T-shape cavity in DFR layers, according to some embodiments.

FIG. 4B shows one or more example lithography processes to create an inverse T-shape cavity in DFR layers, according to some embodiments.

Figure 1:
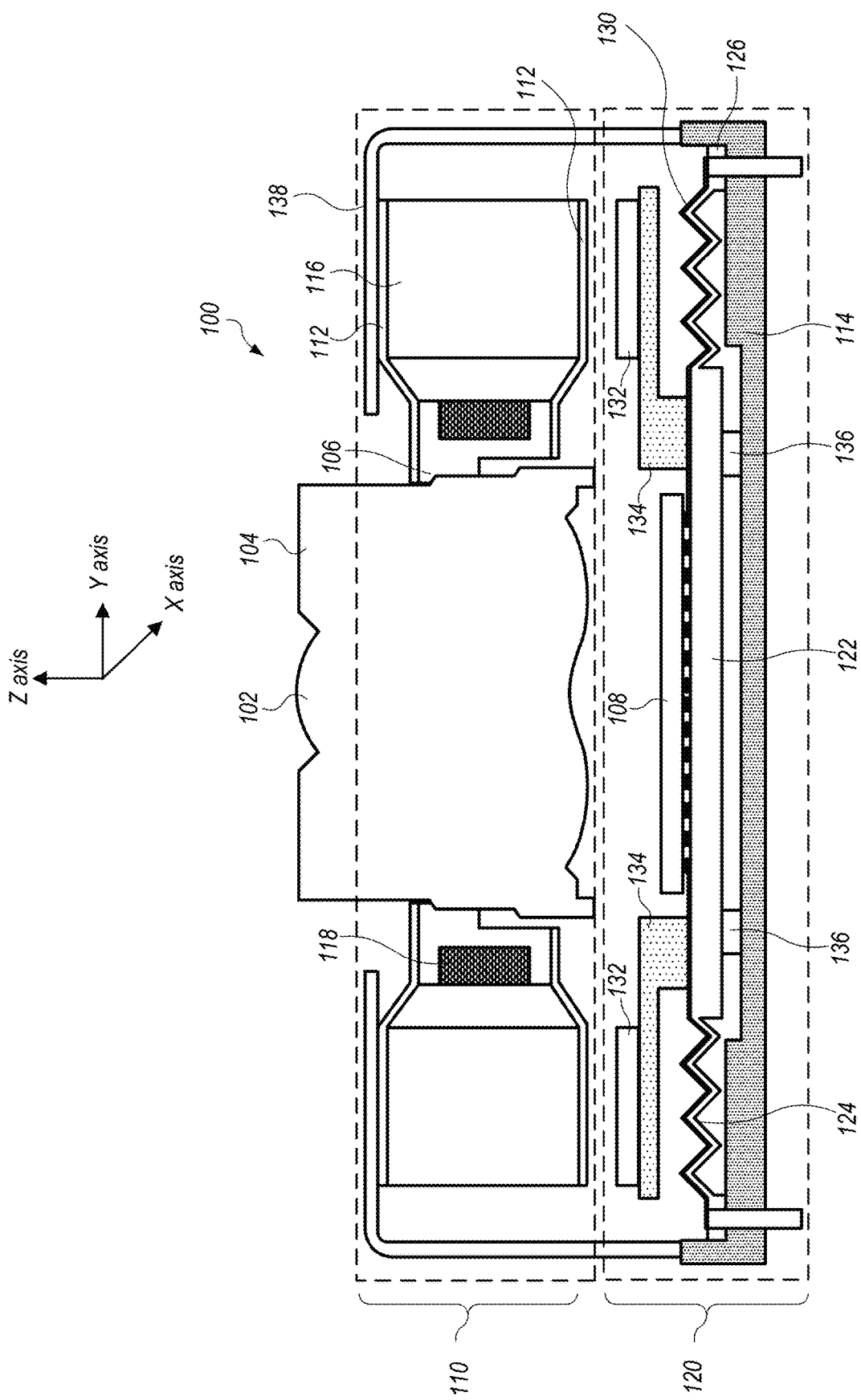
FIG. 1 illustrates an example camera which may include a suspension assembly having electrical traces, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

In various embodiments, techniques for forming a suspension assembly are disclosed herein. In some embodiments, the suspension assembly may be part of autofocus (AF) and/or optical image stabilization (OIS) systems of a camera, which may allow optical lens(es) and image sensor of the camera to move relative to each other. For instance, the suspension assembly may include an inner frame for coupling with an image sensor of a camera, an outer frame which may be spatially fixed with respect to the camera, and one or more flexure arms for connecting the inner frame to the outer frame. In some embodiments, with the flexure arms, one or more actuators (e.g., voice coil motors) may move the inner frame, together with the image sensor, relative to the optical lens(es) of the camera in one or more directions (e.g., along X and/or Y axes relative to the Z axis or optical axis of the optical lens(es)). The motion of the image sensor relative to the optical lens(es) may be used to implement OIS functions. Similarly, a suspension assembly may be used as part of the AF system, e.g., to provide the movability of the optical lens(es) relative to the image sensor in one or more directions (e.g., along the Z axis or optical axis) to implement autofocus functions.

In some embodiments, one or more electrical traces may be added to the suspension assembly. For instance, the electrical traces may be added at one side or both sides of the inner frame, outer frame, and/or flexure arms. Combination of the electrical traces with the suspension assembly may provide a more space-efficient solution for routing electrical traces. In some embodiments, the electrical traces may serve as a power delivery channel (e.g., to supply power to the image sensor) or signal transfer link (e.g., to transfer signals between the image sensor and an "external" processor).

In some embodiments, the suspension assembly including the inner frame, outer frame, and flexure arms may be formed using one or more etching processes. For instance, a substrate (e.g., a metal sheet of a few hundred micrometers) may be etched to remove certain parts of the metal sheet to form the inner frame, outer frame, and/or flexure arms of the suspension assembly. In some embodiments, it may be desired for the flexure arms to have a small inter-arm space between individual flexure arms. The decreased inter-arm space can reduce the overall size of the suspension assembly, and/or provide extra space for the other components of the suspension assembly. For instance, when the flexure arms become closer to each other, more space may become available for the inner frame, and thus it may become possible to use a larger image sensor.

There may be a minimum space restriction for an etching process to maintain an access to the part(s) of the substrate that need to be etched for creating the suspension assembly. Therefore, the techniques disclosed herein may form the suspension assembly using a different approach—e.g., based on one or more electroforming (or electroplating) processes. The electroforming processes may form the suspension assembly based on a thin substrate (e.g., a thin metal foil of a few tens of micrometers). In some embodiments, one or more electrical traces may first be formed at one side of the substrate. For instance, a first electrically conductive material (e.g., including a nickel cobalt alloy or a nickel tungsten alloy) may be deposited at a first side of the substrate using the electroforming processes to form the electrical traces. In some embodiments, one or more layers of dry film photoresist (DFR) may be used to coat the substrate. The DFR may include either a negative photoresist or a positive photoresist. In some embodiments, one or more cavities may be created in the DFR layers at a second side of the substrate facing opposite the first side according to one or more patterns for forming various components of the suspension assembly, e.g., one or more flexure arms. For instance, the cavities may be generated by exposing the DFR layers to ultraviolet (UV) light of the same or different wavelengths to create the cavities in various shapes, e.g., a T-shape, an inverse T-shape, or an hourglass shape, for the flexure arms. In some embodiments, a second electrically conductive material (e.g., a copper titanium alloy) may be deposited in to the cavities to form the flexure arms whose shape may be defined by the cavities generated according to the patterns. Note that the disclosed techniques may be used to form various components of the suspension assembly, including the inner frame, outer frame, and/or flexure arms. The disclosed techniques can alleviate the minimum space restriction as seen in the etching processes (by using the electroforming processes to form the suspension assembly components), and reduce the size of the suspension assembly. For instance, the inter-arm spacing may be reduced from hundreds of micrometers (e.g., ~180 μm or higher) to tens of micrometers (e.g., ~25-40 μm or even lower), e.g., depending on the thickness of the DFR layers. In some embodiments, the outer frame may be further designed to be foldable relative to the inner frame to an angle to further reduce the size of the suspension assembly in one or more directions, e.g., in X and/or Y axes.

In some embodiments, a relatively thicker substrate (e.g., a metal sheet of a few hundred micrometers) other than a thin foil may be used to form the suspension assembly with the disclosed techniques. For instance, one or more parts of the substrate may first be etched to create a thin foil (e.g., a thin foil of a few tens of micrometers). Next, one or more electroforming processes (similar to those described above) may be applied to the thin foil to form electrical traces, together with components of the suspension assembly (e.g., one or more flexure arms). In some embodiments, one or more remaining parts of the substrate which were not etched may be used directly to form an inner frame and/or an outer frame. This may be suitable especially for scenarios where the substrate may be used directly (without electroforming) to create the inner frame and/or outer frame.

FIG. 1 illustrates an example camera which may include a suspension assembly having electrical traces, according to some embodiments. In the example as shown in FIG. 1, camera 100 may include optical lens 102 inside lens assembly 104 which may be packaged in lens carrier 106. In some embodiments, camera 100 may include image sensor 108 for producing image data (e.g., represented by electrical signals) based on light captured by and transmitted from optical lens 102. In some embodiments, camera 100 may include axial motion voice coil motor 110. Axial motion voice coil motor 110 may include a suspension assembly having one or more flexure arms 112 for moveably mounting optical lens carrier 104 to base 114, where base 114 may be mechanically fixed to enclosure 138 of camera 100. In some embodiments, axial motion voice coil motor 110 may include one or more magnets 116 mounted to base 114, and one or more focusing coils 118 fixedly mounted to lens carrier 106 and mounted to base 114 through flexure arms 112. In some embodiments, focusing coils 118 may carry currents which may interact with the magnetic field of magnets 116 to generate motive forces (e.g., Lorentz forces). With flexure arms 112, the motive forces may allow lens assembly 104 containing optical lens 102 to move relative to image sensor 108, e.g., along an optical axis or Z axis of optical lens 102, thus implementing autofocus (AF) functions for camera 100.

In some embodiments, camera 100 may further include transverse motion voice coil motor 120. Transverse motion voice coil motor 120 may include image sensor inner frame 122 (which may be a dynamic platform), a suspension assembly including one or more flexure arms 124 for mechanically connecting image sensor inner frame 122 to image sensor outer frame 126 (which may be a static platform) of transverse motion voice coil motor 120, and one or more optical image stabilization (OIS) coils 132 moveably mounted to image sensor inner frame 122 (e.g., through flexible printed circuit 134). In some embodiments, OIS coils 132 may be positioned within the magnetic fields of magnets 116, and thus may cause the production of motive forces (e.g., Lorentz forces). In some embodiments, camera 100 may include bearing surface end stop 136 mounted to base 114 for restricting motion of image sensor inner frame 122 (and image sensor 108) along an optical axis of optical lens 102 (e.g., Z axis). Thus, with flexure arms 124, the motive forces caused by OIS coils 132 may move image sensor inner frame 122, together with image sensor 108, relative to optical lens 102 in one or more directions (e.g., along X and/or Y axes) orthogonal to the optical axis of optical lens 102 (e.g., Z axis), thus implementing OIS functions for camera 100.

In some embodiments, besides serving as mechanical connections, flexure arms 112 (of axial motion voice coil motor 110) and/or 124 (of transverse motion voice coil motor 120) and other components of the suspension assembly (e.g., the inner frame and/or the outer frame) may also be attached with electrical traces for purpose of power and/or signal transfers. For example, one or more electrical traces 130 may be added at one or both sides of flexure arms 124 to (1) deliver power from a power supply to image sensor 108 (and/or OIS coils 132) and/or (2) transfer signals between image sensor 108 and a processor, where the power supply and/or processor may be located inside or external of camera 100.

Figure 2A:
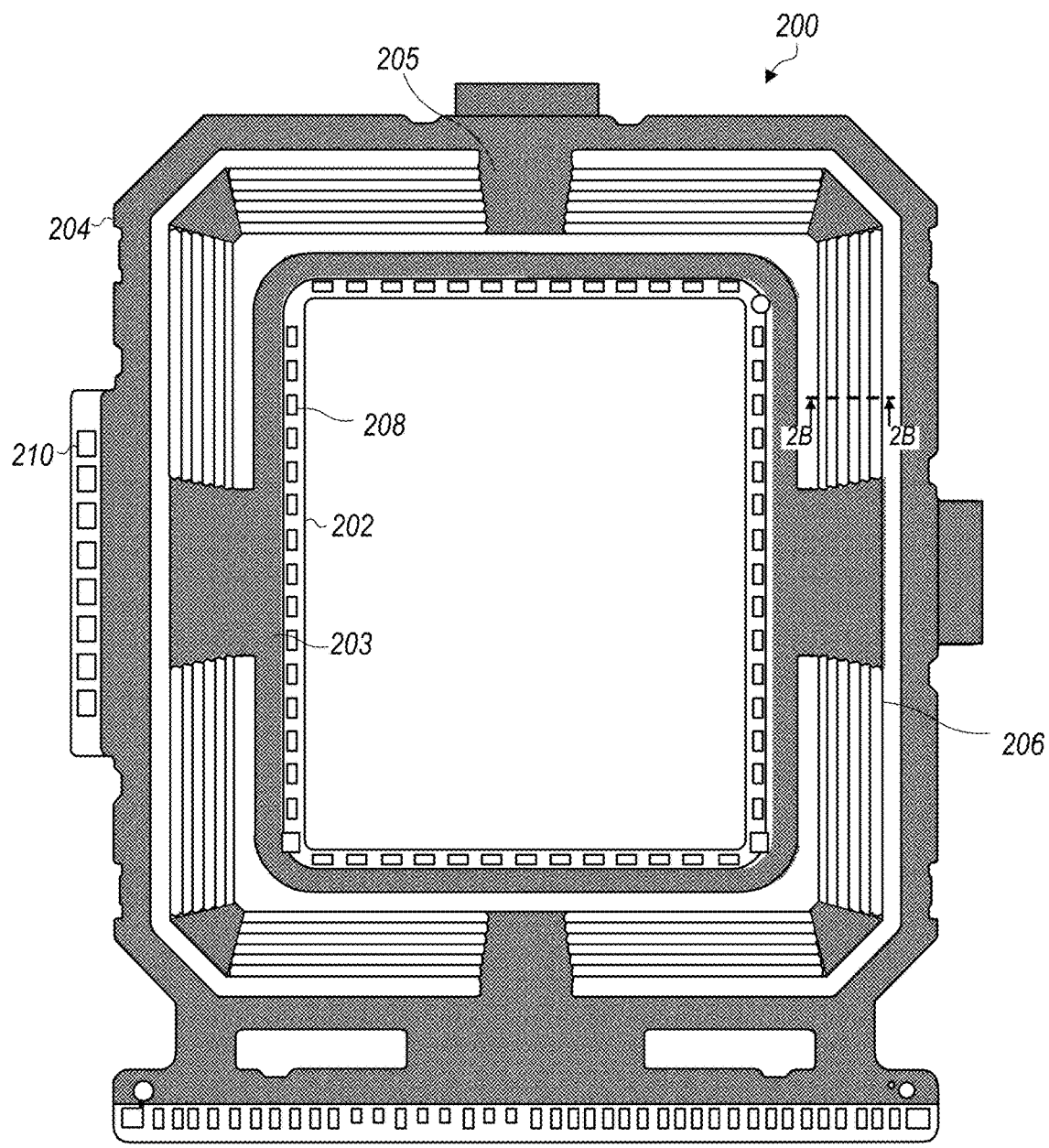
FIG. 2A shows a top view of an example suspension assembly, according to some embodiments.

FIG. 2A shows a top view of an example suspension assembly, according to some embodiments. In some embodiments, suspension assembly 200 may include inner frame 202, outer frame 204, two of which may be connected through flexure arms 206 along a perimeter of inner frame 202. In this example, inner frame 202 may include one or more obtrusions 203 (e.g., towards outer frame 204), whilst outer frame may include one or more obtrusions 205 (e.g., towards inner frame 202). Flexure arms 206 may be coupled to obtrusions 203 (of inner frame 202) to obtrusions 205 (of outer frame 204) and thus implement the connection between inner frame 202 and outer frame 205, as shown in FIG. 2A. In some embodiments, flexure arms 206 may be spaced apart from each other substantially evenly according to an inter-arm spacing. As described above, with techniques disclosed here, the inter-arm spacing between flexure arms 206 may be greatly reduced, e.g., from hundreds of micrometers (e.g., 200 µm) to tends of micrometers (e.g., 50 µm). In some embodiments, inner frame 202 and outer frame 204 may each include one or more conductor pads 208 and pads 210. Conductor pads 208 and 210 may serve as electrical connecting points for inner frame 202 and outer frame 204, respectively. For instance, an image sensor may rest on inner frame 202, where input/output (I/O) ports of the image sensor may be surface mounted to conductor pads 208. Conductor pads 208 may further be connected to electrical traces attached to flexure arms 206, and the electrical traces may extend and connect to conductor pads 210 of outer frame 204.

Figure 2B:
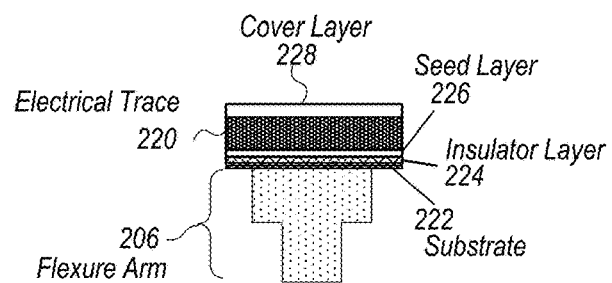
FIG. 2B shows a cross-sectional view of an example flexure arm of a suspension assembly, according to some embodiments.

FIG. 2B shows a cross-sectional view of an example flexure arm of a suspension assembly, according to some embodiments. As shown in FIG. 2A, the cross-sectional view in FIG. 2B corresponds to a position indicated by the line and two arrows. For purposes of illustration, only one single flexure arm 206 is shown in FIG. 2B, although the cross-sectional view at the position indicated in FIG. 2A may include multiple flexure arms. In this example, flexure arm 206 may be in a T-shape attached to substrate 222. In some embodiments, both flexure arm 206 and substrate 222 may comprise metal. For instance, flexure arm 206 may be made from copper titanium, whilst substrate 222 may include copper. In some embodiments, there may be insulator layer 224 and seed layer 226 between substrate 222 and electrical trace 220d. Insulator layer 224 may include at least one dielectric material, e.g., polyamide, ajinomoto build-up film (ABF), and/or other dielectric materials, to provide electrical insulation between substrate 222 and electrical trace 220, whilst seed layer 226 may include metal and be used to facilitate deposition of electrical trace 220 on to substrate 222, in one or more electroforming processes as described below. In some embodiments, there may be a cover layer 228, e.g., an insulator layer, to provide protection for electrical trace 220. Note that, besides a T-shape, flexure arm 206 may be in various shapes as needed. For instance, flexure arm 206 may have an inverse T-shape, an hourglass shape, etc.

Figure 3A:
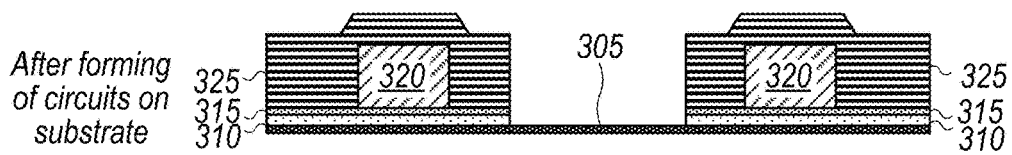
FIGS. 3A-3L show an example process to form flexure arms with electrical traces using a negative DFR, according to some embodiments.
Figure 3B:
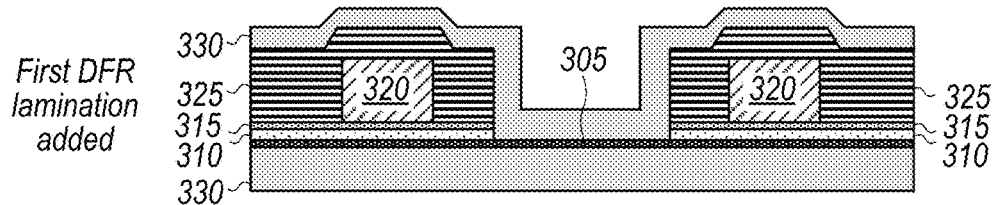
Figure 3C:
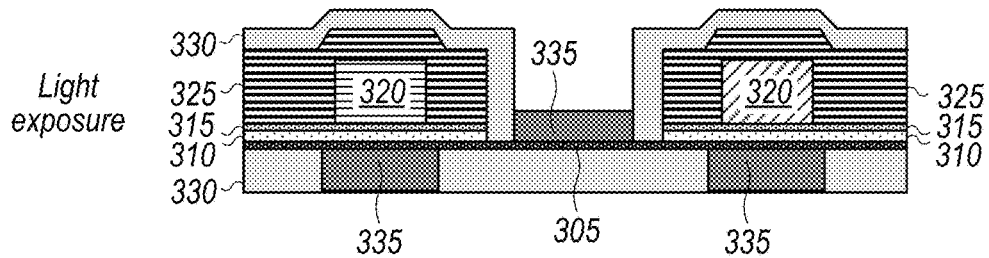
Figure 3D:
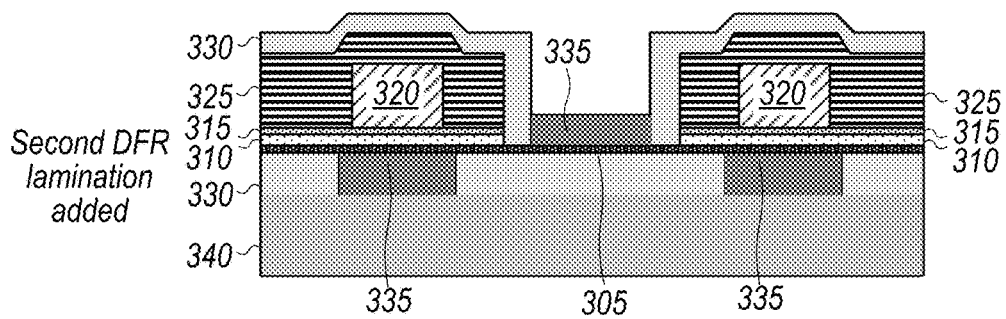
Figure 3E:
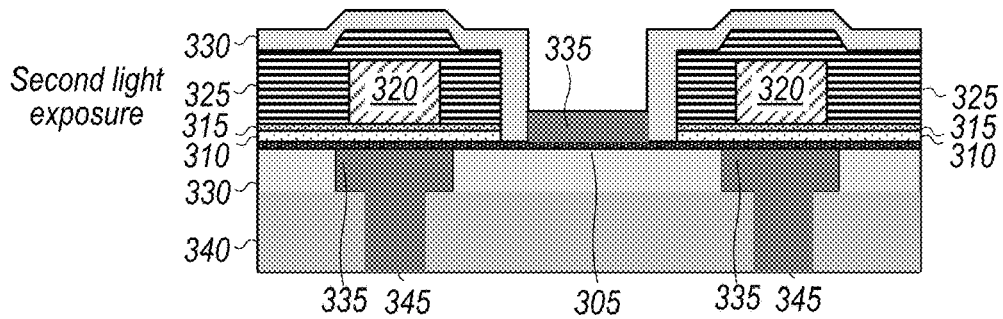
Figure 3F:
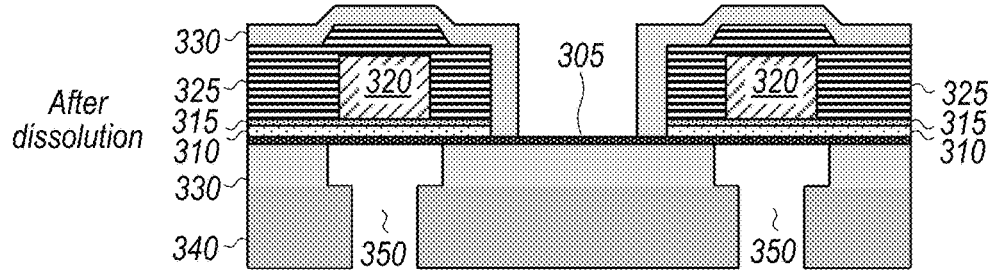
Figure 3G:
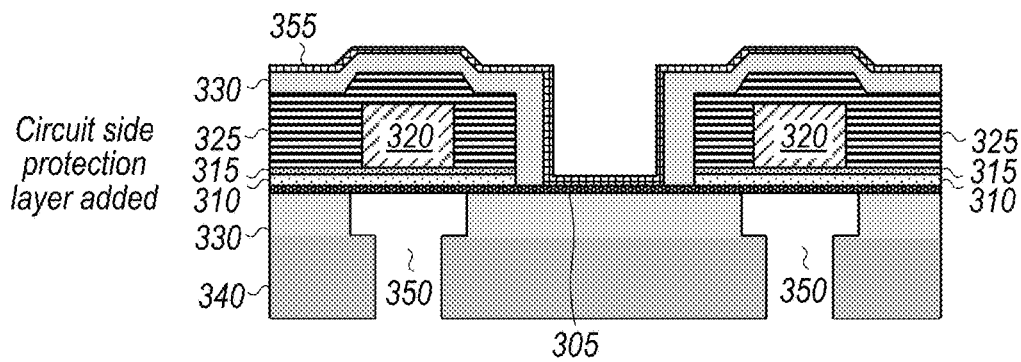
Figure 3H:
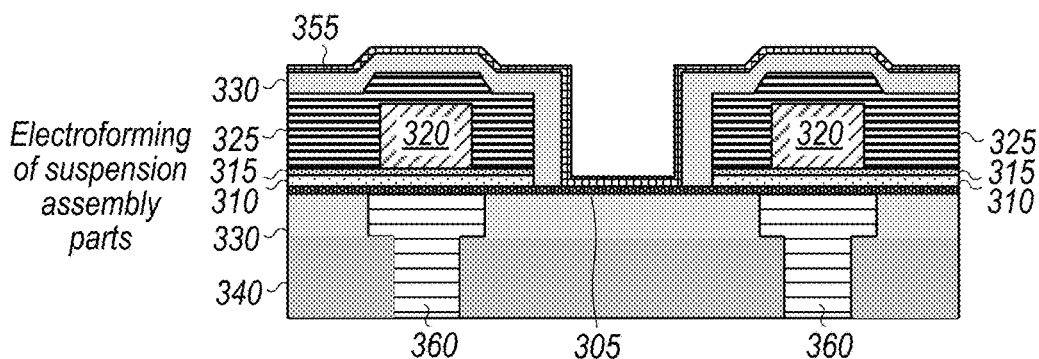
Figure 3I:
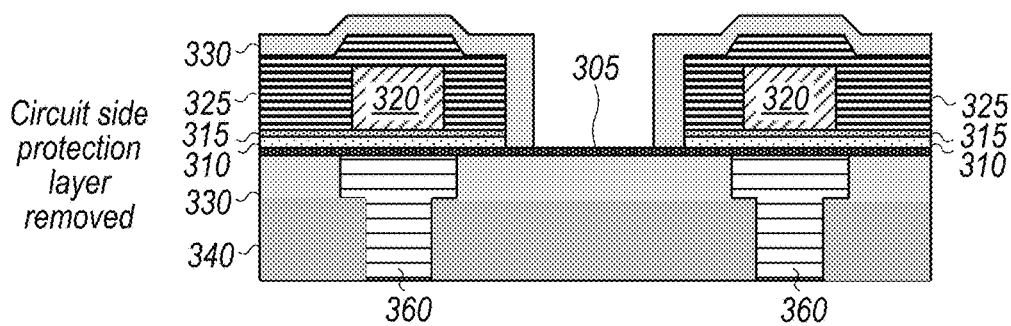
Figure 3J:
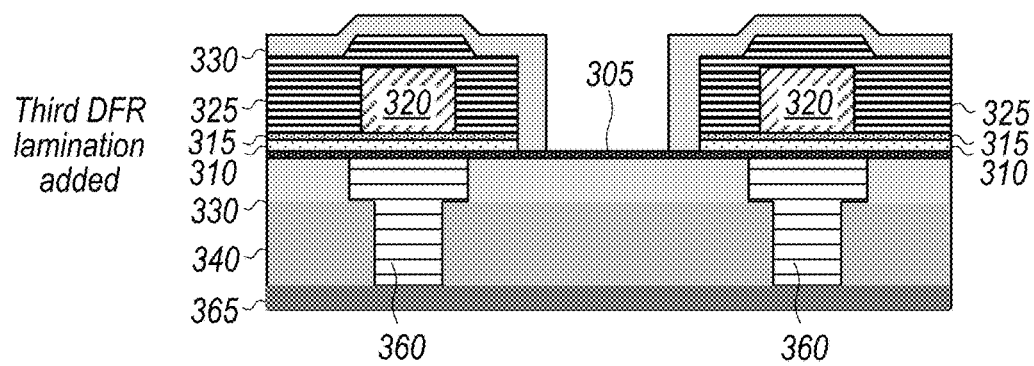
Figure 3K:
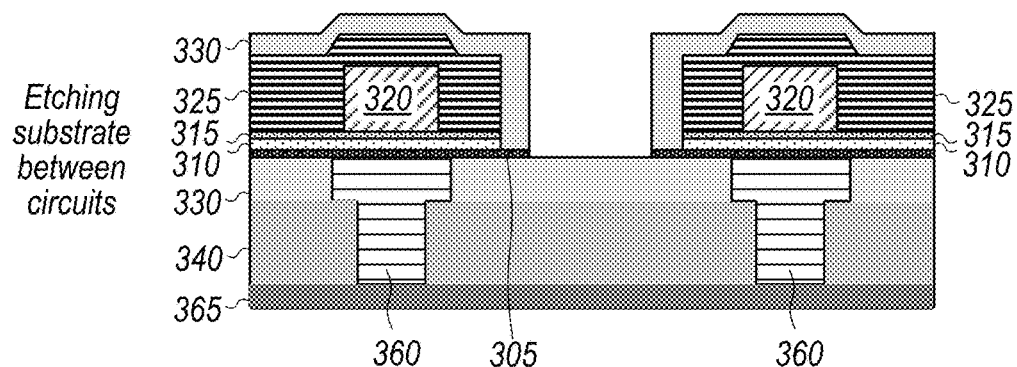
Figure 3L:
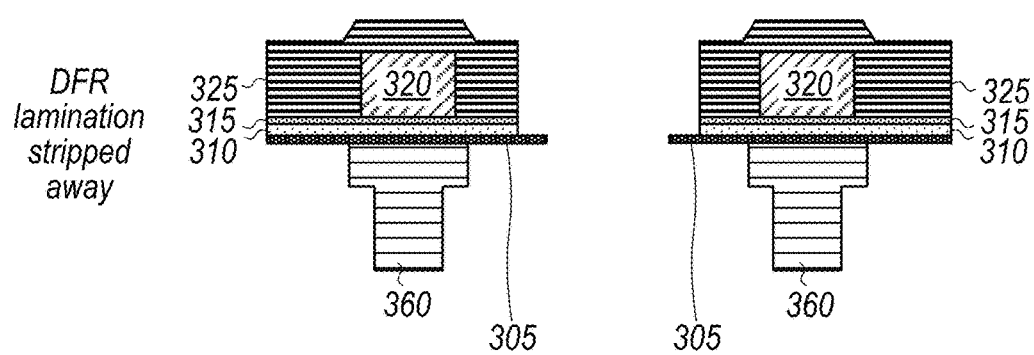

FIGS. 3A-3L show an example process to form flexure arms with electrical traces using a negative DFR, according to some embodiments. The example process illustrated may include three sections: lithography (e.g., as shown in FIGS. 3A-3F), electroforming (e.g., as shown in FIGS. 3G-3I), and etching (e.g., as shown in FIGS. 3J-3L). For purposes of illustration, two electrical traces and two flexure arms are illustrated to be formed at different sides of a substrate. In some embodiments, the example process may be used to form less or more electrical traces and flexure arms, and/or other components (e.g., an inner frame and/or an outer frame) of a suspension assembly. As shown in FIG. 3A, the lithography section may start with forming one or more electrical traces 320 at a first side of substrate 305. In some embodiments, substrate 305 may be a thin metal foil, e.g., a copper foil with a thickness of a few tens of micrometers. Insulator layer 310, e.g., an insulator layer including polyamide, ABF, and/or other dielectric materials, may be used to coat one or more regions at the first side of substrate 305 to isolate later-formed electrical traces 320 from substrate 305. Next, seed layer 315 may be applied on top of insulator layer 310. In some embodiments, seed layer 315 may comprise an electrically conductive material, e.g., copper. A photoresist layer may then be used to cover seed layer 315. Next, the photoresist layer may be exposed to UV light through a patterned photomask, and the regions that were exposed (e.g., in cases where a positive DFR is used) or unexposed (e.g., in cases where a negative DFR is used) may be removed by dissolving the exposed or exposed photoresist with a solvent (also called developer). The result may be substrate 305 with a patterned photoresist layer which may expose seed layer 315 on the bottom of the pattern. Next, an additive manufacturing process may be used where a voltage may be applied across an anode and seed layer 315 to deposit an electrically conductive material on to exposed seed layer 315 to form electrical traces 320 at a first side of substrate 305. In some embodiments, the electrically conductive material for forming electrical traces 320 may include a nickel cobalt alloy or a nickel tungsten alloy. In some embodiments, cover layer 325, which may include at least one dielectric material, may be applied to cover electrical traces 320 at the first side of substrate 305 to provide a protection of electrical traces 320.

Referring to FIG. 3B, after the forming of electrical traces 320 at the first side of substrate 305, a first dry film photoresist (DFR) layer 330, e.g., including a negative photoresist, may be added at the first side and a second side (which may be opposite to the first side) of substrate 305. Next, as shown in FIG. 3C, DFR layer 330 at the second side of substrate 305 may be exposed to UV light through a patterned photomask to create one or more patterns 335 in DFR layer 330. In this example as shown in FIG. 3C, patterns 335 may include a rectangular shape. Next, as shown in FIG. 3D, a second DFR layer 340 may be applied to coat the second side of substrate 305, e.g., on top of the first DFR layer 330 at the second side. In some embodiments, DFR layer 340 may include a negative photoresist which may be the same as or different from the negative photoresist of DFR layer 330. Referring back to FIG. 3E, the second DFR layer 340 may then be exposed to UV light to create one or more patterns 345 in the second DFR layer 340. In this example as shown in FIG. 3E, patterns 345 may include a rectangular shape connected to patterns 335 but having a different size from patterns 335 such that patterns 335 and 355 together may form one or more T-shapes in DFR layers 330 and 340. Next, referring to FIG. 3F, one or more parts of DFR layers 330 and 340 corresponding to patterns 335 and 345 may be dissolved away using a solvent to thus create T-shape cavities 350 at the second side of substrate 305. Also, note that one or more parts of DFR layer 330 between electrical traces 320 at the first side of substrate 305 may also be removed, thus exposing substrate 305 between electrical traces 320.

FIGS. 3G-3I show the next section—an electroforming section—of the example process, according to some embodiments. As shown in FIG. 3G, after the lithography section, circuit protection layer 355 may be applied to the first side of substrate 305 to further protect electrical traces 320. Next, as shown in FIG. 3H, one or more electroforming processes may be used to form flexure arms 360 in DFR layers 330 and 340 at the second side of substrate 305. For instance, the electroforming processes may include an additive manufacturing process, where a voltage may be applied across an anode and substrate 305 exposed at the bottom of cavities 350 to deposit an electrically conductive material within cavities 350 to form flexure arms 360. In some embodiments, the electrically conductive material for forming flexure arms 360 may include a copper titanium alloy. In this example as shown in FIG. 3H, flexure arms 360 may be formed in a T-shape. Referring back to FIG. 3I, after the forming of flexure arms 360 at the second side of substrate 305, circuit protection layer 355 may be removed.

FIGS. 3J-3L show the next section—an etching section—of the example process, according to some embodiments. As shown in FIG. 3J, after the electroforming section, a third DFR layer 365 may be applied at the second side of substrate 305 to cover exposed flexure arms 360. Next, as shown in FIG. 3K, one or more etching processes may be used to remove one or more exposed parts of substrate 305 in between electrical traces 320 such that flexure arms 360 may separate from each other. Finally, as shown in FIG. 3L, residual DFR layers 330, 340, and 365 may be stripped away.

As described, the example process described above may also be used to form other components of a suspension assembly, e.g., an inner frame and/or an outer frame, with electrical traces. For instance, one or more electrical traces may be formed at a first side of a thin foil substrate, e.g., as described above with regards to FIG. 3A. Next, depending on the size and shape of an inner frame (and/or outer frame), one or more cavities 350 may be created in one or more DFR layers at a second side of the substrate, e.g., as described above with regards to FIGS. 3B-3F. For instance, the cavities at the second side of the substrate may have a rectangular shape (not a T-shape) for the inner frame (and/or outer frame). Next, one or more electroforming processes, e.g., as described above in FIGS. 3G-3I, may be used to deposit a material (e.g., a copper titanium alloy and/or other metal materials) within the cavities to form the inner frame. Finally, residual photoresists may be removed, e.g., as described above in FIG. 3L.

FIG. 4A shows one or more example lithography processes to create a T-shape cavity in DFR layers, according to some embodiments. As shown in FIG. 4A, at 410, a first DFR layer 404 and a second DFR layer 406 may cover substrate 402 at one side of substrate 402. In some embodiments, DFR layer 404 and DFR layer 406 may include the same or different photoresists. At 410, DFR layers 404 and 406 may be exposed to UV light, e.g., UV light of 405 nm wavelength, through a photomask to create a first pattern 408 in DFR layers 404 and 406. In this example shown in FIG. 4A, pattern 408 may include a rectangular shape. Next, at 420 in FIG. 4A, another lithography process may be applied with UV light through another photomask to create a second pattern 410 in DFR layer 406. By using laser direct imaging (LDI) techniques, UV light of different wavelengths may be used in the example lithography processes. For instance, the second pattern 410 may be created by exposing DFR layer 406 to UV light of 375 nm wavelength. In some embodiments, pattern 410 may have the same or different shape and/or size as pattern 408. In this example, pattern 410 may also include a rectangular shape having a different size from pattern 408, thus patterns 408 and 410 together may form a T-shape. Referring back to FIG. 4A, at 430, DFR layers 404 and 406 may be subject to a solvent to dissolve one or more parts of DFR layers 404 and 406, according to patterns 408 and 410, to thus generate T-shape cavity 412 in DFR layers 404 and 406. As described above, e.g., with regards to FIG. 3H, one or more electroforming processes may next be used to deposit material in to cavity 412 to form part of a suspension assembly, e.g., a T-shape flexure arm.

FIG. 4B shows one or more example lithography processes to create an inverse T-shape cavity in DFR layers, according to some embodiments. As shown in FIG. 4B, at 440, a first DFR layer 474 may be applied to coat substrate 472 at one side of substrate 472. At 440, DFR layer 474 may be subject to UV light exposure, e.g., UV light of 405 nm wavelength, through a photomask to create pattern 478 in DFR layer 474. Next, at 450, a second DFR layer 476 may be applied on top of the first DFR layer 474 and exposed to UV light, e.g., the same UV light as 440 (e.g., UV light of 405 nm wavelength) or UV light of a different wavelength (e.g., UV light of 375 nm wavelength), through another photomask to create pattern 480 in DFR layer 476. In this example as shown in FIG. 4B, patterns 478 and 480 together may form an inverse T-shape. Next, at 460, one or more parts of DFR layers 474 and 476 corresponding to patterns 478 and 480 may be dissolved away to create inverse T-shape civility 482.

Figure 5A:
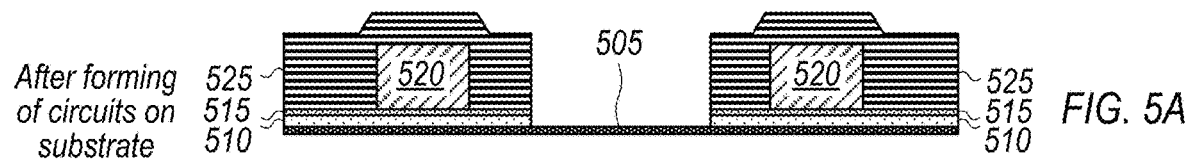
FIGS. 5A-5J show an example process to form flexure arms with electrical traces using both a negative DFR and a positive DFR, according to some embodiments.
Figure 5B:
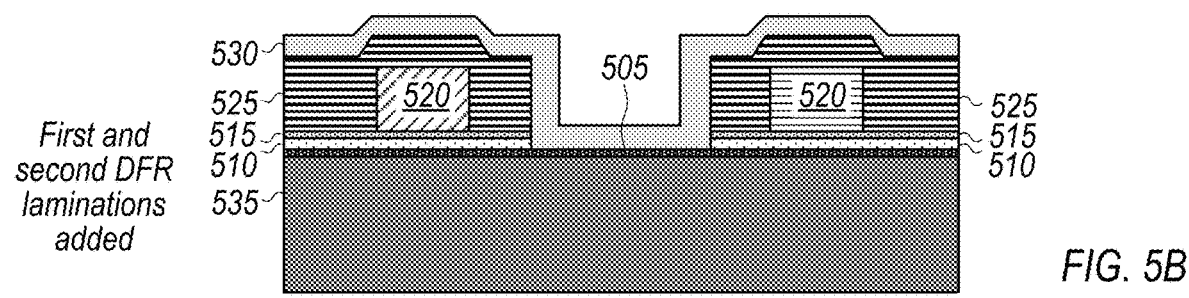
Figure 5C:
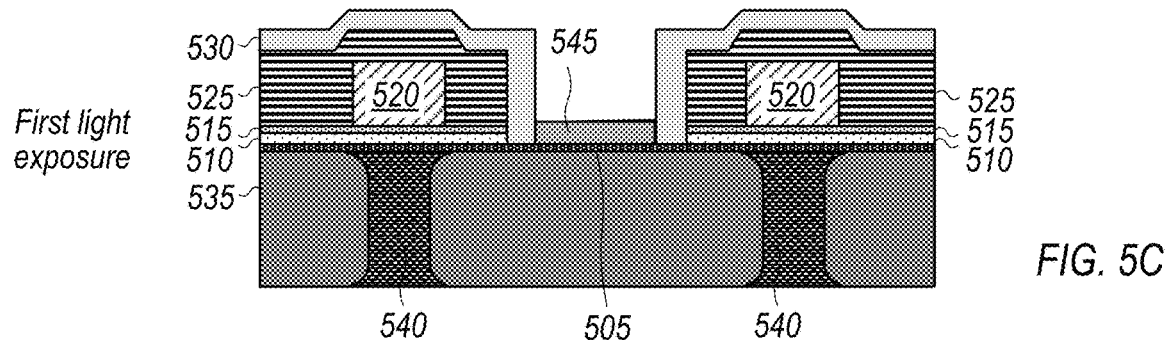
Figure 5D:
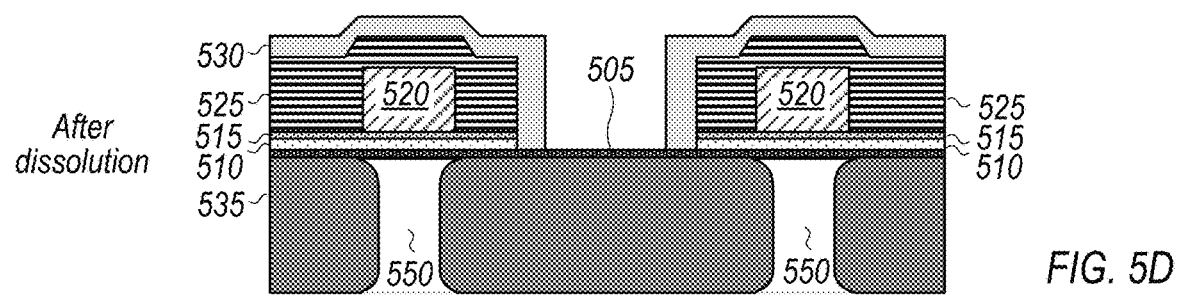
Figure 5E:
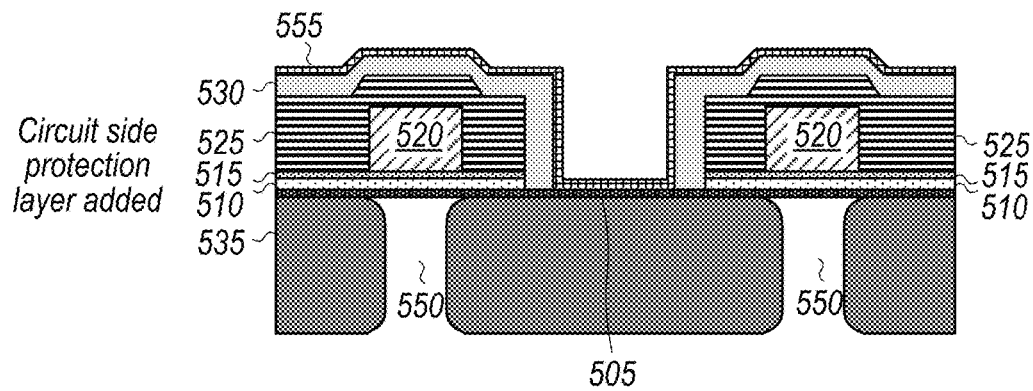
Figure 5F:
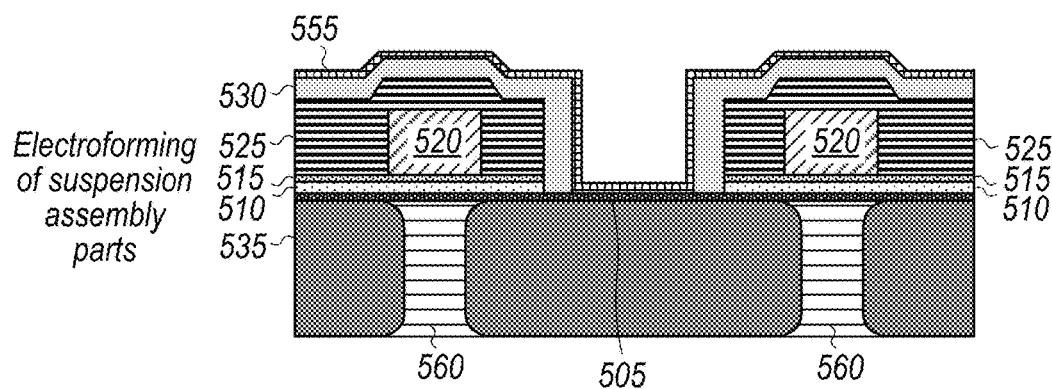
Figure 5G:
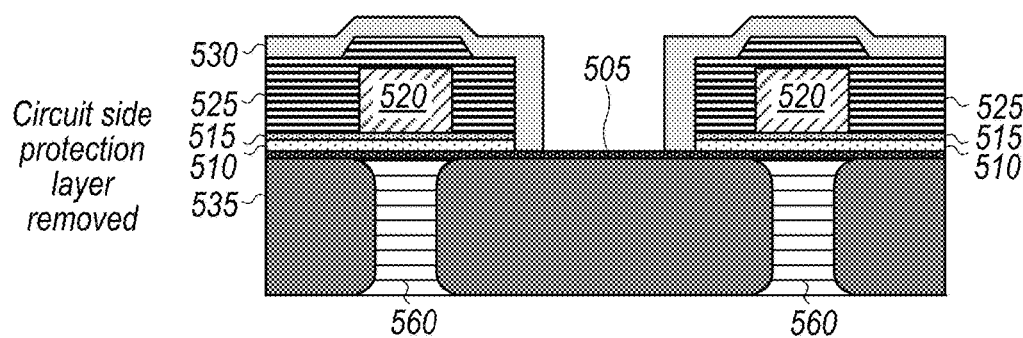
Figure 5H:
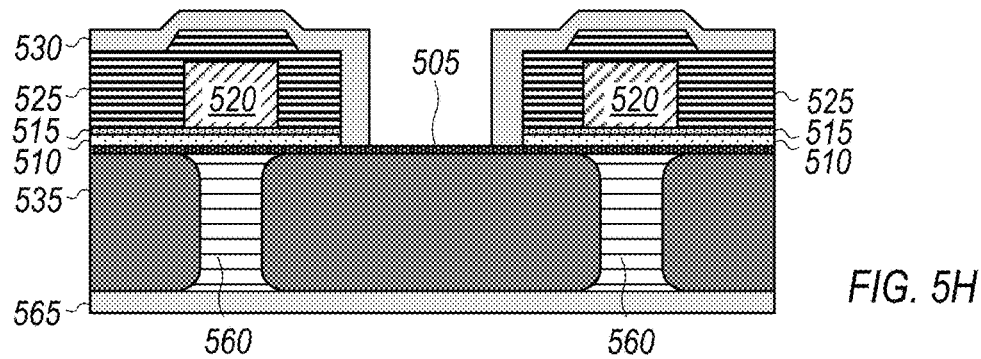
Figure 5I:
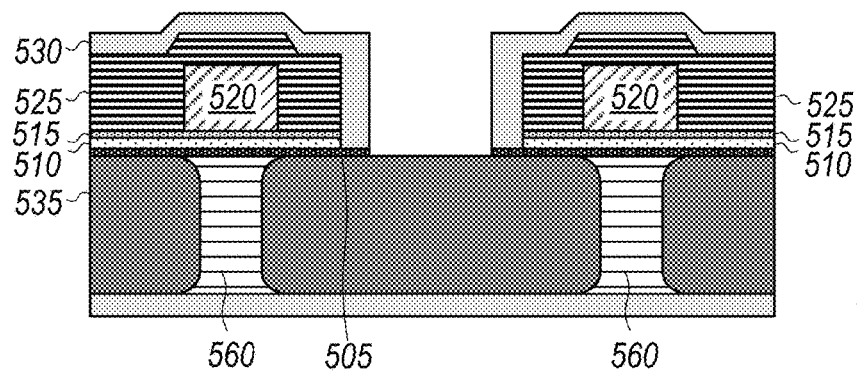
Figure 5J:
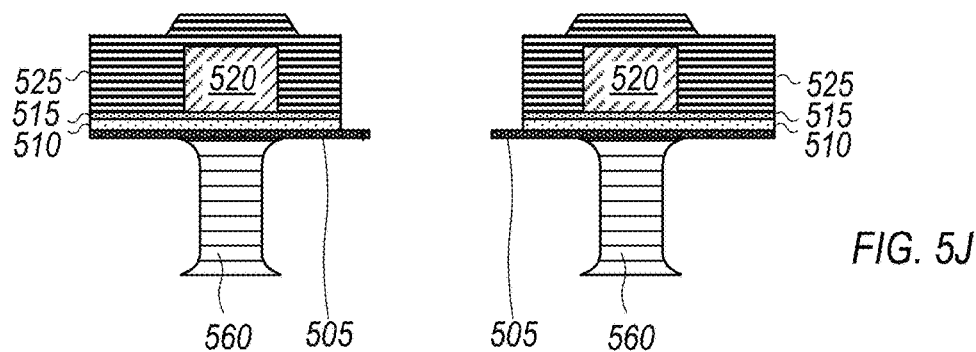

FIGS. 5A-5J show an example process to form flexure arms with electrical traces using both a negative DFR and a positive DFR, according to some embodiments. Similar to the example process illustrated in FIG. 3, the example process in FIG. 5 may be also divided into three sections: lithography (e.g., as shown in FIGS. 5A-3D), electroforming (e.g., as shown in FIGS. 5E-5G), and etching (e.g., as shown in FIGS. 5H-5J). As shown in FIG. 5A, electrical traces 520 may be formed at a first side of substrate 505, using one or more electroforming processes as described above with regards to FIG. 3A. Note that there may be insulator layer 510, seed layer 515, and cover layer 525 at the first side of substrate 505, as shown in FIG. 5A. Next, as shown in FIG. 5B, a first DFR layer 530 (including a negative DFR) and a second DFR layer 535 (including a positive DFR) may be applied at the first side and a second side of substrate 505, where the second side may face opposite the first side. One difference between the negative and positive DFRs may be associated with the photosensitive characteristics of the negative and positive photoresists. For instance, in the case of a positive photoresist, the positive photoresist may become degraded by light and a solvent may dissolve away the regions that were exposed to light, leaving behind a coating where the mask was placed. By comparison, in the case of a negative photoresist, the negative photoresist may become strengthened (either polymerized or cross-linked) by light, and the solvent may dissolve away only the regions that were not exposed to light, leaving behind a coating in areas where the mask was not placed. In addition, a positive photoresist may be able to maintain its size and pattern because the solvent may not easily permeate the regions that have not been exposed to the UV light. By comparison, the solvent may permeate both exposed and unexposed regions of a negative photoresist which may lead to pattern distortions. Thus, in some embodiments, the positive DFR may be used to achieve better resolution requirements, especially for creating complicated patterns or shapes. Note that, in some embodiments, a positive DFR may be applied to both sides of substrate 505, e.g., in order to maintain process stability.

Referring back to FIG. 5C, both negative DFR layer 530 and positive DFR layer 535 may be exposed to UV light to create pattern 545 in negative DFR layer 530 (at the first side of substrate 505) and pattern 540 in positive DFR layer 535 (at the second side of substrate 505). In this example, pattern 445 may have a rectangular shape which may be less complicated than the hourglass shape of pattern 540 (thus it may be chosen to use positive DFR 535). Next, as shown in FIG. 5D, one or more parts of DFR layer 430 and 535 may be removed, e.g., using a solvent, to create one or more hourglass-shape cavities 550 in positive DFR layer 535 at the second side of substrate 505 as well as remove negative DFR layer 530 between electrical traces 520 at the first side of substrate 505.

FIGS. 5E-5G show the next section—an electroforming section—of the example process, according to some embodiments. As shown in FIG. 5E, after the lithography section, circuit protection layer 555 may be applied to the first side of substrate 305 to further protect electrical traces 520. Next, as shown in FIG. 5F, one or more electroforming processes may be used to form one or more parts of a suspension assembly, e.g., flexure arms 560, in the hourglass shape at the second side of substrate 505. For instance, the electroforming processes may include an additive manufacturing process to deposit an electrically conductive material (e.g., a copper titanium alloy) within cavities 550 to form flexure arms 560. Referring back to FIG. 5G, after the forming of flexure arms 560 at the second side of substrate 505, circuit protection layer 555 may be removed.

FIGS. 5H-5I show the next section—an etching section—of the example process, according to some embodiments. As shown in FIG. 5H, after the electroforming section, a third DFR layer 565 may be applied at the second side of substrate 505 to cover exposed flexure arms 560. Next, as shown in FIG. 5I, one or more etching processed may be applied to remove substrate 505 between electrical traces 520. Finally, as shown in FIG. 5J, residual DFR layers 530, 535, and 565 may be stripped away.

As described above, the example processes in FIGS. 3 and 5 may be implemented based on a thin substrate (e.g., substrate 305 and 505), such as a thin copper foil of a few tens of micrometers thickness. In some embodiments, a suspension assembly, together with electrical traces, may also be formed based on a relatively thicker substrate, e.g., a copper titanium sheet of a few hundred micrometers. This example process may include one or more steps similar to those of the example processes illustrated above in FIGS. 3 and 5. For instance, the example process may start with etching one or more parts of the copper titanium sheet to generate a thin foil in a few tens of micrometers thickness. The thin foil may be similar to the substrate, e.g., substrate 305 and 505 described above with regards to FIGS. 3 and 5. Next, the lithography, electroforming, and etching processes such as those illustrated above in FIGS. 3A-3L and 5A-5J may be used to form electrical traces and one or more components of the suspension assembly, e.g., one or more flexure arms, from the thin foil created out of the copper titanium sheet. The rest of the copper titanium sheet which were not etched at the beginning of this example process may be used directly as the inner frame and/or outer frame for the suspension assembly. This example process may be suitable especially in scenarios where the substrate may be used directly (without electroforming) to create the inner frame and/or outer frame.

Figure 6:
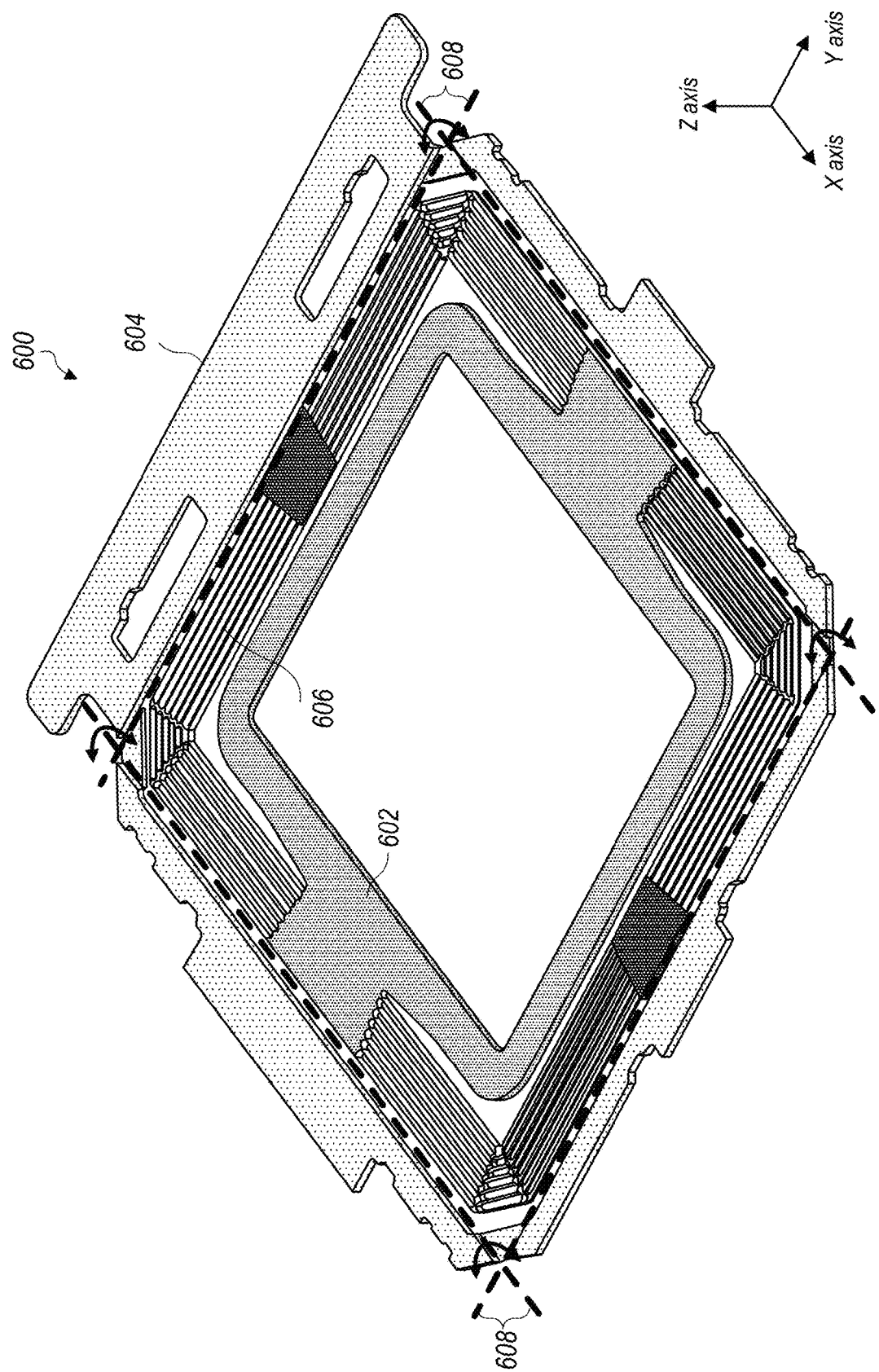
FIG. 6 shows an example suspension assembly with a foldable outer frame, according to some embodiments.

FIG. 6 shows an example suspension assembly with a foldable outer frame, according to some embodiments. In this example, suspension assembly 600 may include inner frame 602, which may be mechanically coupled to outer frame 604 through one or more flexure arms 606. In this example, suspension assembly 600 may be designed such that outer frame 604 may be folded to an angle relative to inner frame 602. For instance, outer frame 604 may be folded along a perimeter between inner frame 602 and 604, as indicated by dashed lines 610, along the Z axis up to an angle ranging from, e.g., −180° to 180°, with respect to inner frame 602. This may allow the size of suspension assembly 600 to further reduce in one or more direction, e.g., in the X and Y axes as shown in FIG. 6. Moreover, this may provide additional flexibilities as to the connections of electrical traces and/or image sensor to outer frame 604 and/or inner frame 602. For instance, by folding outer frame 604 from zero to 90° relative to inner frame 602, one or more electrical traces may now be able to be attached to corresponding conductor pad(s) of outer frame 604 in a vertical position (rather than in a horizontal position).

Figure 7:
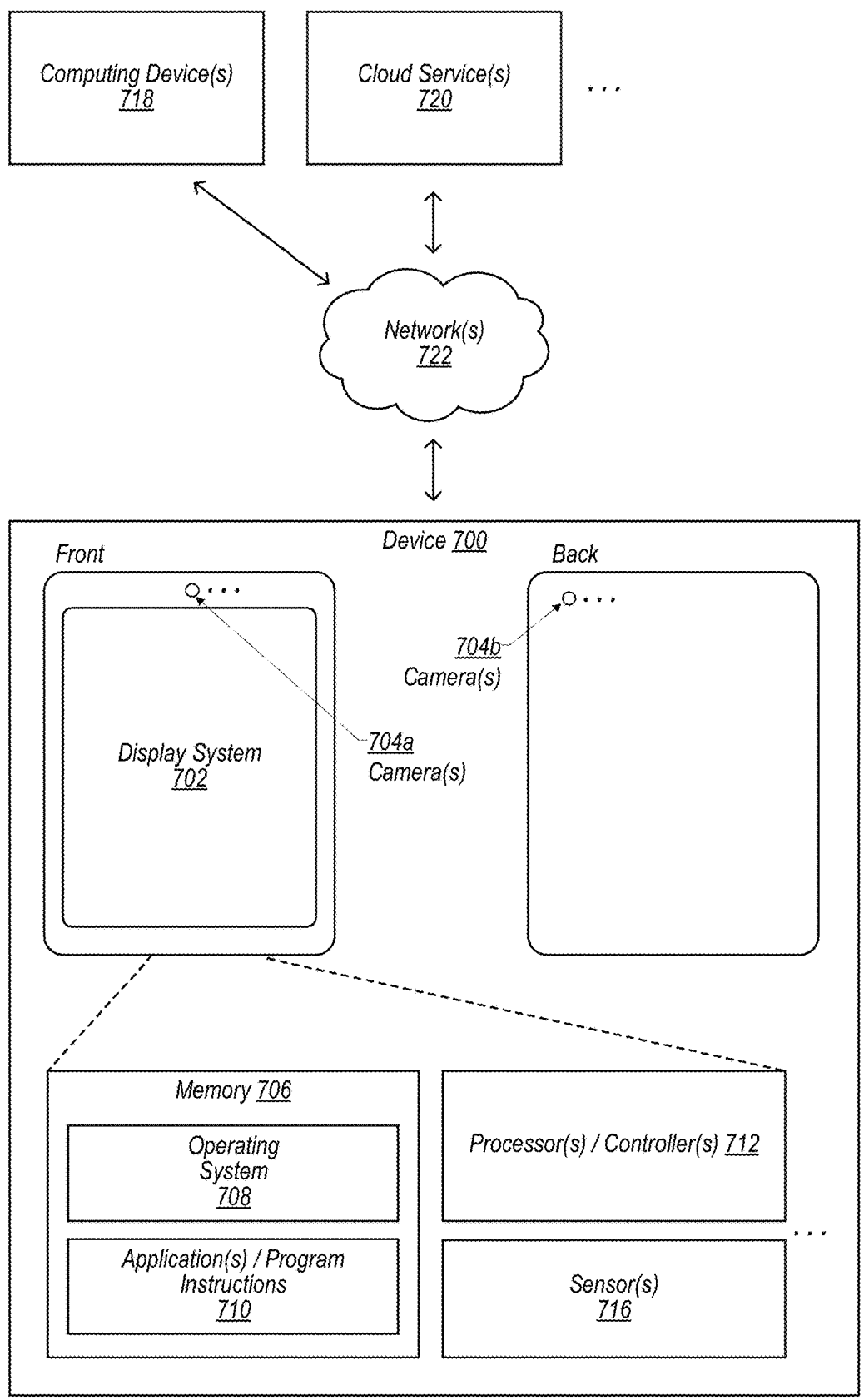
FIG. 7 illustrates a schematic representation of an example device 700 that may include a camera having one or more suspension assemblies, according to some embodiments.

FIG. 7 illustrates a schematic representation of an example device 700 that may include a camera having one or more suspension assemblies, as described herein with reference to FIGS. 1-6, according to some embodiments. In some embodiments, the device 700 may be a mobile device and/or a multifunction device. In various embodiments, the device 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 700 may include a display system 702 (e.g., comprising a display and/or a touch-sensitive surface) and/or one or more cameras 704. In some non-limiting embodiments, the display system 702 and/or one or more front-facing cameras 704a may be provided at a front side of the device 700, e.g., as indicated in FIG. 7. Additionally, or alternatively, one or more rear-facing cameras 704b may be provided at a rear side of the device 700. In some embodiments comprising multiple cameras 704, some or all of the cameras may be the same as, or similar to, each other. Additionally, or alternatively, some or all of the cameras may be different from each other. In various embodiments, the location(s) and/or arrangement(s) of the camera(s) 704 may be different than those indicated in FIG. 7.

Among other things, the device 700 may include memory 706 (e.g., comprising an operating system 708 and/or application(s)/program instructions 710), one or more processors and/or controllers 712 (e.g., comprising CPU(s), memory controller(s), display controller(s), and/or camera controller(s), etc.), and/or one or more sensors 716 (e.g., orientation sensor(s), proximity sensor(s), and/or position sensor(s), etc.). In some embodiments, the device 700 may communicate with one or more other devices and/or services, such as computing device(s) 718, cloud service(s) 720, etc., via one or more networks 722. For example, the device 700 may include a network interface (e.g., network interface 810) that enables the device 700 to transmit data to, and receive data from, the network(s) 722. Additionally, or alternatively, the device 700 may be capable of communicating with other devices via wireless communication using any of a variety of communications standards, protocols, and/or technologies.

Figure 8:
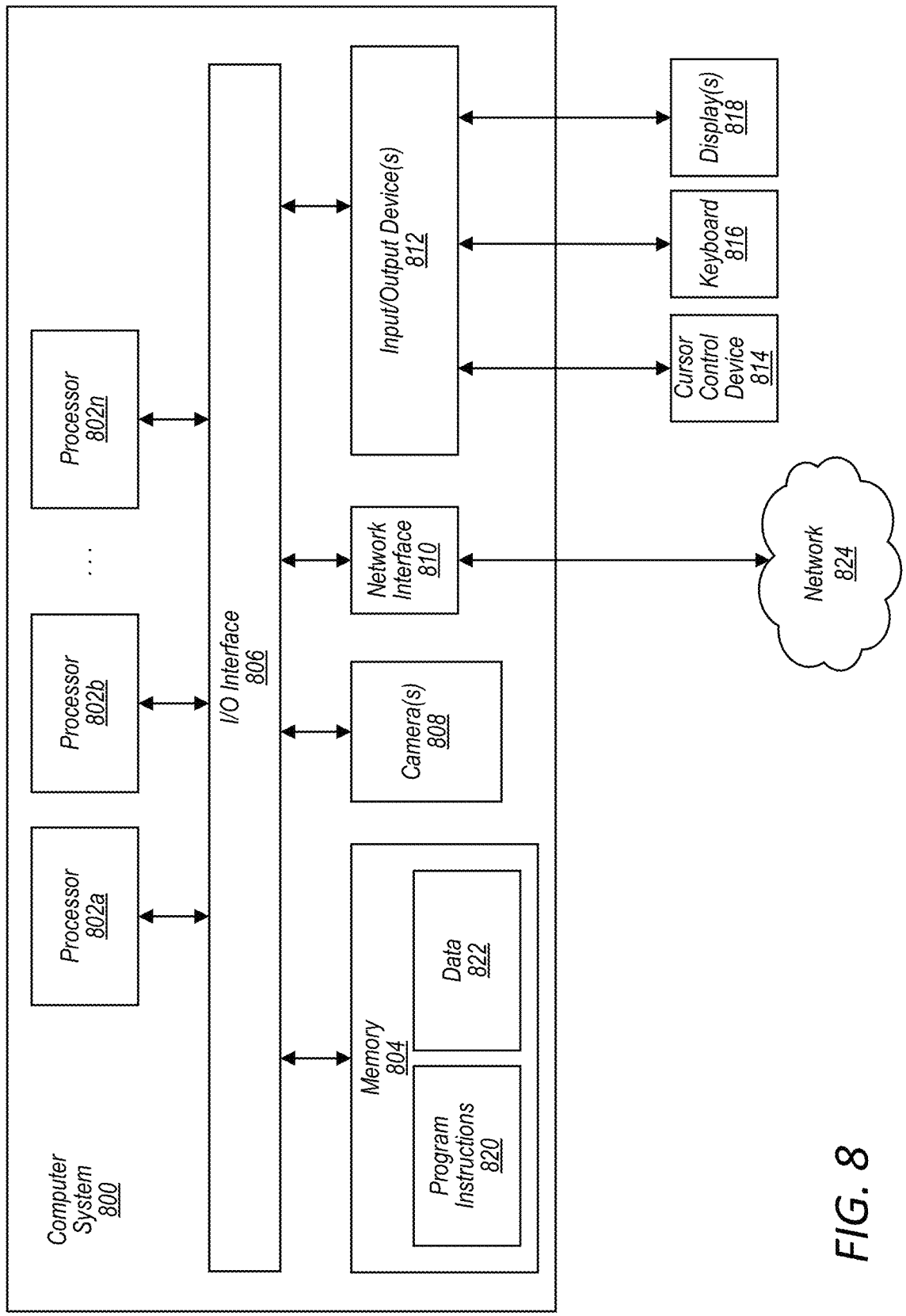
FIG. 8 illustrates a schematic block diagram of an example computing device which may include a camera having one or more suspension assemblies, according to some embodiments.

FIG. 8 illustrates a schematic block diagram of an example computing device which may include a camera having one or more suspension assemblies, e.g., as described herein with reference to FIGS. 1-7, according to some embodiments. In addition, computer system 800 may implement methods for controlling operations of the camera and/or for performing image processing images captured with the camera. In some embodiments, the device 700 (described herein with reference to FIG. 7) may additionally, or alternatively, include some or all of the functional components of the computer system 800 described herein.

The computer system 800 may be configured to execute any or all of the embodiments described above. In different embodiments, computer system 800 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 800 includes one or more processors 802 coupled to a system memory 804 via an input/output (I/O) interface 806. Computer system 800 further includes one or more cameras 808 coupled to the I/O interface 806. Computer system 800 further includes a network interface 810 coupled to I/O interface 806, and one or more input/output devices 812, such as cursor control device 814, keyboard 816, and display(s) 818. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 802, or a multiprocessor system including several processors 802 (e.g., two, four, eight, or another suitable number). Processors 802 may be any suitable processor capable of executing instructions. For example, in various embodiments processors 802 may be general-purpose or embedded processors implementing any of a variety of instruction set architectures (ISAs), such as the x86, PowerPC, SPARC, or MIPS ISAs, or any other suitable ISA. In multiprocessor systems, each of processors 802 may commonly, but not necessarily, implement the same ISA.

System memory 804 may be configured to store program instructions 820 accessible by processor 802. In various embodiments, system memory 804 may be implemented using any suitable memory technology, such as static random access memory (SRAM), synchronous dynamic RAM (SDRAM), nonvolatile/Flash-type memory, or any other type of memory. Additionally, existing camera control data 822 of memory 804 may include any of the information or data structures described above. In some embodiments, program instructions 820 and/or data 822 may be received, sent or stored upon different types of computer-accessible media or on similar media separate from system memory 804 or computer system 800. In various embodiments, some or all of the functionality described herein may be implemented via such a computer system 800.

In one embodiment, I/O interface 806 may be configured to coordinate I/O traffic between processor 802, system memory 804, and any peripheral devices in the device, including network interface 810 or other peripheral interfaces, such as input/output devices 812. In some embodiments, I/O interface 806 may perform any necessary protocol, timing or other data transformations to convert data signals from one component (e.g., system memory 804) into a format suitable for use by another component (e.g., processor 802). In some embodiments, I/O interface 806 may include support for devices attached through various types of peripheral buses, such as a variant of the Peripheral Component Interconnect (PCI) bus standard or the Universal Serial Bus (USB) standard, for example. In some embodiments, the function of I/O interface 806 may be split into two or more separate components, such as a north bridge and a south bridge, for example. Also, in some embodiments some or all of the functionality of I/O interface 806, such as an interface to system memory 804, may be incorporated directly into processor 802.

Network interface 810 may be configured to allow data to be exchanged between computer system 800 and other devices attached to a network 824 (e.g., carrier or agent devices) or between nodes of computer system 800. Network 824 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 810 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 812 may, in some embodiments, include one or more display terminals, keyboards, keypads, touchpads, scanning devices, voice or optical recognition devices, or any other devices suitable for entering or accessing data by one or more computer systems 800. Multiple input/output devices 812 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 810.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method, comprising:
    forming at least a part of a suspension assembly, wherein:
        the suspension assembly comprises:
            an inner frame for coupling with an image sensor of a camera;
            an outer frame; and
            one or more flexure arms for connecting the inner frame to the outer frame, wherein the one or more flexure arms are configured to allow motion of the inner frame, together with the image sensor, in one or more directions relative to the outer frame,
wherein the forming comprises:
forming one or more electrical traces at a first side of a substrate; and
forming the one or more flexure arms at a second side of the substrate,
wherein the second side faces opposite the first side, and wherein the forming the one or more flexure arms comprises:
depositing, using one or more electroforming processes, a first material within one or more cavities defined by at least one layer of at least a second material that is different than the first material, wherein a flexure arm of the one or more flexure arms comprises the first material and is shaped based on a shape of a corresponding cavity within which the first material is deposited; and
removing at least a part of the second material that at least partially surrounds the flexure arm.

2. The method of claim 1, wherein the substrate comprises copper.

3. The method of claim 1, wherein the first material comprises a copper titanium alloy.

4. The method of claim 1, wherein the one or more electrical traces comprise a nickel cobalt alloy or a nickel tungsten alloy.

5. The method of claim 1, wherein the second material comprises a positive or negative dry film photoresist (DFR).

6. The method of claim 1, wherein at least one flexure arm of the one or more flexure arms is formed in a T-shape, an inverse T-shape, or an hourglass shape.

7. The method of claim 1, wherein the forming the one or more electrical traces at the first side of the substrate comprises depositing, using the one or more electroforming processes, at least a third material at the first side of the substrate to form the one or more electrical traces.

8. The method of claim 1, wherein the outer frame is configured to be foldable with respect to the inner frame to provide an angle between the outer frame and the inner frame.

9. The method of claim 1, wherein the one or more cavities in the at least one layer of at least the second material are created by exposing the at least one layer of at least the second material to ultraviolet light of a same or different wavelengths, and wherein subsequent to depositing the first material within the one or more cavities, the forming the one or more flexure arms comprises removing, using one or more etching processes, one or more parts of the substrate such that the one or more flexure arms separate from each other.

10. The method of claim 1, wherein the forming the at least a part of the suspension assembly further comprises:
forming one or more additional electrical traces at the first side of the substrate; and
forming the inner frame or outer frame at the second side of the substrate,
wherein the forming the inner frame or outer frame comprises:
depositing, using the one or more electroforming processes, a third material within one or more additional cavities defined by the at least one layer of at least the second material that is different than the third material, wherein the inner frame or outer frame comprises third first material and is shaped based on a shape of a corresponding cavity within which the third material is deposited; and
removing at least a part of the second material that at least partially surrounds the inner frame or outer frame.

11. A camera, comprising:
at least one optical lens;
an image sensor; and
a suspension assembly including:
an inner frame for coupling with the image sensor;
an outer frame;
one or more electrical traces at a first side of a substrate; and
one or more flexure arms at a second side of the substrate facing opposite the first side, wherein the one or more flexure arms are configured to connect the inner frame with the outer frame to allow motion of the inner frame, together with the image sensor, in one or more directions relative to the outer frame, and wherein at least one of the one or more flexure arms includes a first material in a shape defined by one or more cavities created in a second material using one or more electroforming processes.

12. The camera of claim 11, wherein the substrate comprises copper.

13. The camera of claim 11, wherein the first material comprises a copper titanium alloy.

14. The camera of claim 11, wherein the one or more electrical traces comprise a nickel cobalt alloy or a nickel tungsten alloy.

15. The camera of claim 11, wherein the second material comprises a dry film photoresist (DFR).

16. The camera of claim 15, wherein the DFR comprises a positive photoresist or a negative photoresist.

17. The camera of claim 11, wherein at least one flexure arm of the one or more flexure arms is formed in a T-shape, an inverse T-shape, or an hourglass shape.

18. The camera of claim 11, wherein the one or more cavities in the second material are created by exposing the second material to ultraviolet light of a same or different wavelengths, and wherein the at least one of the flexure arms is formed by depositing the first material in the one or more cavities to form the at least one of the flexure arms at the second side of the substrate.

19. The camera of claim 11, wherein the outer frame is configured to be foldable with respect to the inner frame to provide an angle between the outer frame and the inner frame.

20. A device, comprising:
one or more processors;
memory storing program instructions executable by the one or more processors to control operations of a camera; and
the camera, comprising:
at least one optical lens;
an image sensor; and
a suspension assembly including:
an inner frame for coupling with the image sensor;
an outer frame;
one or more electrical traces at a first side of a substrate; and
a plurality of flexure arms at a second side of the substrate facing opposite the first side, wherein the plurality of flexure arms are configured to connect the inner frame with the outer frame to allow motion of the inner frame, together with the image sensor, in one or more directions relative to the outer frame, and wherein adjacent flexure arms of the plurality of flexure arms are spaced apart according to an inter-arm spacing less than 180 micrometers.

* * * * *